Aug. 9, 1960      E. J. LAWTON      2,948,666

IRRADIATION PROCESS

Filed Nov. 21, 1956

Inventor:
Elliott J. Lawton, by Paul A. Frank
His Attorney.

Patented Aug. 9, 1960

2,948,666

IRRADIATION PROCESS

Elliott J. Lawton, Schenectady, N.Y., assignor to General Electric Company, a corporation of New York Filed Nov. 21, 1956, Ser. No. 623,703

14 Claims. (Cl. 204—154)

This invention relates to stable, high energy irradiated polypropylene and to processes by which it is produced. More particularly, this invention relates to a process of irradiating high molecular weight polypropylene, which is normally a crystalline solid at room temperature, which comprises irradiating polypropylene at 100–125° C. This invention also relates to a process of producing stable, irradiated polypropylene which comprises (1) irradiating at about room temperature or below 100° C. polypropylene which is normally a crystalline solid at room temperature, and (2) thereupon heating the irradiated polymer to render it less crystalline than at the irradiation temperature or substantially amorphous (also called "annealing"), for example, by heating to 120–260° C., but preferably 130–200° C.

Although low molecular weight polypropylenes which are normally liquid at room temperature have long been known, recently there have been developed polypropylenes which are crystalline solids at room temperature. These unique high molecular weight polypropylenes which have been described in Belgian Patents 530,617 and 538,-782; in Natta et al., JACS 77, 1708 (1955); "J. Polymer Science," XVI, 143 (1955); "Chemical Week" 78, 69–70 (February 4, 1956); "Chemical and Engineering News," vol. 34, p. 2980, etc. have high melting points and have been prepared as films, fibers, etc. Where the term "polypropylene" is used hereafter in this specification, it refers to these polymers.

When one attempts to cross-link polypropylene with high energy irradiation, unsatisfactory results are usually obtained. Thus, when polypropylene is irradiated in the lower temperature ranges, such as from 25° to 90° C., little cross-linking is effected and the irradiated polymer produced is unstable to oxygen or air. On the other hand, when polypropylene is irradiated at elevated temperature, such as above 125° C., radiation-induced degradation proceeds much faster than cross-linking with the net result that there is a sharp decrease in the cross-linked material formed.

Unexpectedly, I have now discovered that the temperature conditions during and immediately following the irradiation of polypropylene are critical. Thus, I have found that maximum cross-linking occurs when polypropylene is irradiated at about 100–125° C., but preferably at 110–120° C. I have also found that polypropylene irradiated at about room temperature or below 100° C. and immediately heated to a temperature at which it is less crystalline or substantially amorphous, preferably 130–200° C., produces a stable cross-linked polymer. This result is unexpected since polypropylene irradiated at about room temperature but without any subsequent heat treatment is not appreciably cross-linked, and the resulting irradiated polymer not only has reduced physical properties but is also very unstable in the presence of air.

Thus, when polypropylene is irradiated at room temperature with $60 \times 10^6$ R.E.P., without annealing, its percent elongation decreases from 250% to zero.

The features of the invention desired to be protected are pointed out with particularity in the appended claims. The invention itself, together with further advantages resulting from the process, may best be understood by reference to the following description, taken in connection with the accompanying drawing in which:

Figure 1:
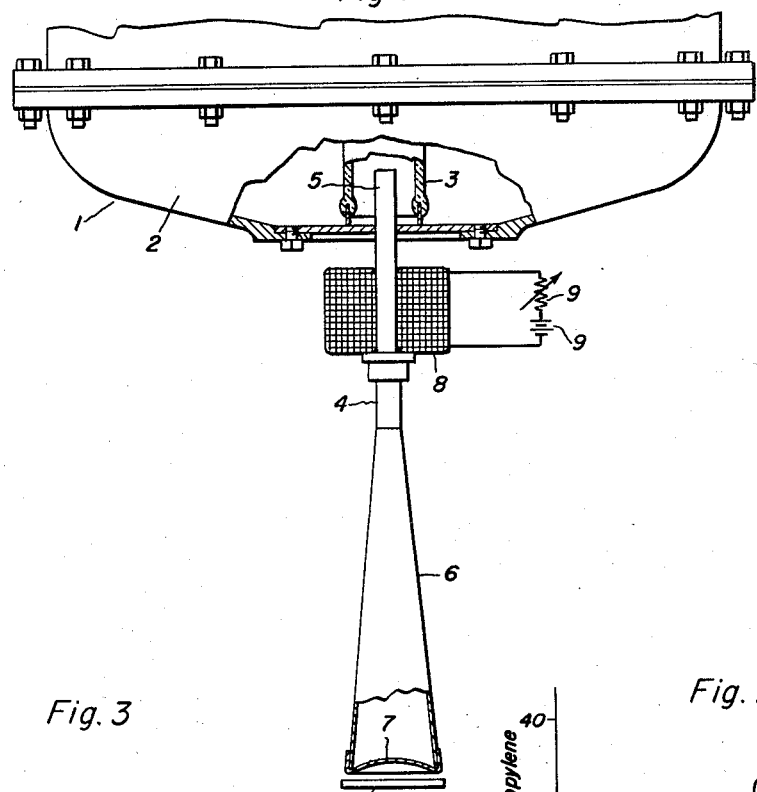
Fig. 1 is a partially sectionalized, simplified view of an electron accelerator apparatus useful in practicing the invention.

One method of preparing the polypropylene useful in this invention has been developed by Natta, who, by using low pressures and a heterocatalyst which is essentially a combination of a metal alkyl and a metal halide of certain physical characteristic, has produced a new class of polypropylenes which are unusual in that they are isotactic or stereospecific polymers having an exceptionally regular structure, i.e. all of the monomeric units have essentially the same steric configuration of the asymmetric carbon atoms resulting in a highly crystalline product. Because the degree of crystallinity can be controlled, a broad spectrum of polypropylenes with special properties can be produced. These polymers have higher melting points than polyethylene, are more resistant to organic solvents than polyethylene, do not have polyethylene's waxy feel, etc. This type of polypropylene is sold by Montecatini Chemical Company of Italy.

Another method of preparing polypropylene developed by Phillips Petroleum Company has been described in Belgian Patent 530,617, etc. This method employs as a catalyst hexavalent chrome oxide on a 10% alumina 90% silica carrier.

Still another method has been developed by Standard Oil of Indiana using reduced metal oxides, such as reduced molybdenum oxides group VIA oxides in combination with complex metal aluminum hydrides, etc. and have been described in U.S. Patents 2,728,754, 2,731,453, 2,692,257, etc.

I have discovered that the crystallinity present in polypropylene appears to trap the free radicals formed on irradiation. These crystalline trapped radicals do not readily cross-link polypropylene but activate the polymer so that it is very readily attacked by oxygen.

However, I have discovered that by reducing crystallinity after irradiation, such as by rendering the polymer less crystalline or substantially amorphous, not only are these trapped free radicals released so that the polymer is more resistant to oxidation but also these released free radicals instead of degrading the polymer by oxidative attack are now freed to further enhance the properties of the polymer by additional cross-linking, thus resulting in a reduction in radiation costs. Thus, when polypropylene is irradiated with $40 \times 10^6$ R.E.P. at 25° C. with no subsequent heat treatment, the product degrades and becomes brittle within four days. In contrast when the same polymer is irradiated to the same dose but thereupon heated to 130° C. for 6 minutes, it exhibits no degradation or brittleness even after 100 days. The significance of this discovery is that irradiation cross-linked polypropylene is not only rendered less susceptible to oxidation but also less expensive to prepare because cross-linking efficiency is enhanced.

I have also discovered that polypropylene is degradatively sensitive to radiation above certain temperatures where degradation proceeds much faster than cross-linking with the net result that there is a sharp decrease in the cross-linked material formed. Although it had been expected that cross-linking efficiency would increase as the temperature was increased due to reduction in crystallinity, it was unexpectedly discovered that maximum cross-linking occurred at 110 to 120° C. above which temperature a sharp decrease in cross-linking was noted. Thus, the temperature range at which polypropylene can be most effectively irradiated is narrow and critical.

In Fig. 1, there is shown high voltage accelerating apparatus 1 capable of producing a beam of high energy electrons for irradiating solid polypropylene in accordance with the invention. High voltage accelerating apparatus 1 may be of the type disclosed in Patent 2,144,518—Westendorp, assigned to the same assignee as the present application. In general, this apparatus comprises a resonant system having an open magnetic circuit inductance coil (not shown) which is positioned within a tank 2 and energized by a source of alternating voltage to generate a high voltage across its extremities. At the upper end (not shown) of a sealed-off, evacuated, tubular envelope 3 is located a source of electrons which is maintained at the potential of the upper extremity of the inductance coil, whereby a pulse of electrons is accelerated down envelope 3 once during each cycle of the energizing voltage when the upper extremity of the inductance coil is at a negative potential with respect to the lower end. Further details of the construction and operation of high voltage accelerating apparatus 1 may be found in the aforementioned Westendorp patent and in "Electronics," vol. 17, pages 128–133 (December 1944).

To permit utilization of the high energy electrons accelerated down envelope 3, there is provided an elongated metal tube 4, the upper portion 5 of which is hermetically sealed to tank 2, as illustrated, by any convenient means, such as silver solder. The lower portion 6 of tube 4 is conical in cross section to allow an increased angular spread of the electron beam. The emergence of high energy electrons from tube 4 is facilitated by an end-window 7 which may be hermetically sealed to tube 4 by means of silver solder. End-window 7 should be thin enough to permit electrons of desired energy to pass therethrough but thick enough to withstand the force of atmospheric pressure. Stainless steel of about 0.002 inch thickness has been found satisfactory for use with electron energies above 230,000 electron volts or greater. Beryllium and other materials of low stopping power may also be employed effectively. By forming end-window 7 in arcuate shape as shown, greater strength for resisting the force of atmospheric pressure may be obtained for a given window thickness. Desired focussing of the accelerated electrons may be secured by a magnetic-field generating winding 8 energized by a source of direct current 9' through a variable resistor 9.

In producing irradiated polypropylene according to the invention, a sheet 10 of polypropylene can be supported in the path of the electrons emerging from end-window 7 as illustrated. The high energy electrons penetrate the polymeric material to a depth dependent upon their energy and effect the above modifications in the properties of the material. Of course, sheet 10 can be in the form of strip material which is passed continuously under end-window 7 at a velocity selected to give the desired irradiation dosage. Other expedients for obtaining the irradiation of the polymer materials in various shapes (e.g., bottles, cups, tubing, filaments, pipes, etc.) will be apparent to those skilled in the art. Uniform treatment of polymeric materials having appreciable thickness can be assured by irradiating them first from one side and then the other or in some cases from both sides simultaneously. In certain instances, it may be desirable to irradiate the polymeric materials in an atmosphere of nitrogen, argon, helium, krypton or xenon, etc., to prevent the damaging effect of any corona which may be present.

The most commonly employed units for measuring high energy radiation are (1) Roentgen units and (2) Roentgen equivalent physical units. Roentgen units are more commonly used to measure gamma and X-rays and are usually defined as the amount of radiation that produces one electrostatic unit of charge per milliliter of dry air under standard conditions. The Roentgen equivalent physical unit (the "R.E.P.") is a convenient unit which usually describes the radiation dose from other than gamma or X-rays, and is the measure of the ionization in the absorber or tissue. The ionization produced by primary radiation is expressed as one R.E.P. when the energy lost in tissue is equivalent to the energy lost by the absorption of one roentgen of gamma or X-rays in air. Further definitions of "roentgen" and "R.E.P." can be found on p. 256 of "The Science and Engineering of Nuclear Power," edited by Clark Goodman (1947), and on p. 436 of "Nuclear Radiation Physics," by Lapp and Andrews (1948). For convenience, the term "Roentgen equivalent physical" or "R.E.P." will be used in the specification and appended claims.

It will be readily realized that other forms of electron accelerating apparatus may be employed instead of high voltage apparatus 1, for example, linear accelerators of the type described by J. C. Slater in the "Reviews of Modern Physics," vol. 20, No. 3, pp. 473–518 (July 1948), may be utilized. To decrease wasteful energy absorption between the point of exit of electrons from the accelerating apparatus and the polymeric materials, a vacuum chamber having thin entrance and exit windows may be inserted in the space.

In general, the energy of the irradiation preferably employed in the practice of my invention may range from about 50,000 to 20 million electron volts or higher depending upon materials. The preferable range is 100,000 to 10 million electron volts. Although high energy electron irradiation is preferred since it produces a large amount of easily controllable high energy, ionizing radiation within a short period of time without rendering the product radioactive, many other sources of high energy, ionizing radiation can also be used in my invention. Examples of such ionizing radiation sources are gamma rays, such as can be obtained from $Co^{60}$, "burnt" uranium slugs, fission by-products, such as waste solutions, separated isotopes, such as $Cs^{137}$, gaseous fission products liberated from atomic reactions, etc.; other electron sources, such as the betatron, etc.; fast or slow neutrons or the mixed neutron and gamma radiation, such as is present in certain atomic reactors; X-rays; and other miscellaneous sources, such as protons, deuterons, α-particles, fission fragments, such as are available from cyclotrons, etc.

The suitable radiation dose employed in carrying out this invention will of course depend upon the properties desired in the irradiated product and the particular polypropylene employed. For example, doses of above $1 \times 10^6$ R.E.P., for example, from about $1 \times 10^6$ R.E.P. to $1 \times 10^8$ R.E.P., but preferably 1 to $50 \times 10^6$ R.E.P. can be employed.

After irradiation, polypropylene is immediately annealed by any suitable means, such as by passing through a heated post-irradiation zone. By immediately annealing, I mean annealing before a substantial amount of oxygen has an opportunity to react with the trapped free radicals so as to degrade the polymer. For long term stability the anneal temperature is critical and the irradiated polymer must be annealed at 120 to 260° C., but preferably at 130 to 200° C. However, temperatures above or below these ranges may impart short term stability. One method of assuring against oxidative attack is to irradiate and retain the product in an inert atmosphere until it has been annealed. When the polymer is kept out of contact with oxygen, delay in annealing does not cause deleterious effects.

In order that those skilled in the art may better understand how the present invention may be practiced, the following example is given by way of illustration and not by way of limitation. All parts are by weight. The apparatus employed was that described in Fig. 1 with 800 k.v.p. electrons. (k.v.p. refers to the peak voltage in kilovolts generated by the inductance coil with high voltage apparatus 1 during the conducting half cycle and thus a measure of the energy emerging from window 7.)

Solubility measurements were employed on the irradiated products to determine the percent of crosslinks formed. Solubility measurements as a measure of percentage of cross-linking are based on the phenomenon that when polypropylene is subjected to irradiation, a principal effect is the formation of cross-links. At some minimum dose, the number of cross-links is sufficient to form gel particles insoluble in such solvents for polypropylene as hot toluene while at higher doses the polymer is sufficiently gelled to resist disintegration in a hot solvent but still yields on swelling some solvent extractable materials.

The effect of irradiation on solubility measurements is determined as follows: A weighed piece of irradiated polypropylene which could have, for example, the following measurements: .002" thickness x 1.25" diameter, is immersed in a solvent for polypropylene, such as about one liter of toluene, and heated for several hours or more to insure complete extraction. The test piece is then removed from the solvent and dried to constant weight under reduced pressure. Percent weight loss is equal to $$\frac{(\text{Initial weight}) - (\text{final weight})}{\text{Initial weight}} \times 100$$

The percent of cross-linked material is equal to 100 minus the percent weight loss.

Polypropylene employed herein was obtained from Montecatini of Italy labeled "polipropilene ad alta cristallinata" (hereafter called "alta grade") having a crystalline melting point of 165–170° C.

EXAMPLES 1

Figure 2:
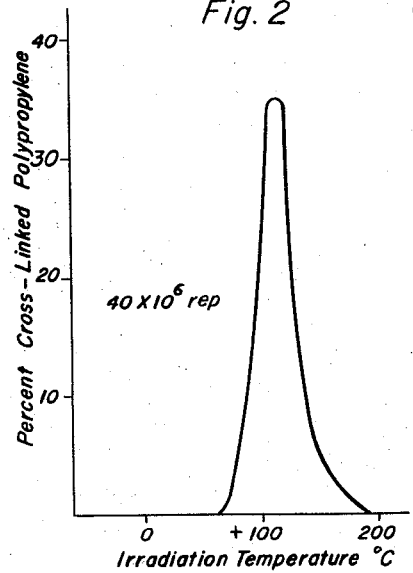
Fig. 2 is a graph wherein percent of cross-linked polypropylene produced by irradiating in nitrogen to a dose of $40 \times 10^6$ R.E.P. is plotted as a function of irradiation temperature. In obtaining the results for this graph the irradiated product was allowed to remain in air for 3–4 days prior to the determination of percent of cross-linked material.

Sections of polypropylene (alta grade) were irradiated with $40 \times 10^6$ R.E.P. in nitrogen over the temperature range shown in Fig. 2. After irradiation these materials which had been allowed to remain in air for 3–4 days were extracted with boiling toluene to determine the percent of cross-linked polymer produced. These results are presented in the graph in Fig. 2 where percent of cross-linked polypropylene is plotted as a function of irradiation temperature. From this graph, it is obvious that the temperature for maximum cross-linking is critical and occurs over a very narrow temperature range.

EXAMPLE 2

Figure 3:
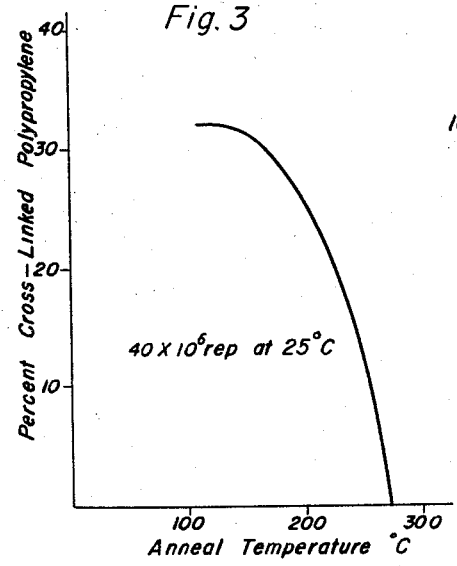
Fig. 3 is a graph wherein is plotted percent of cross-linked polypropylene produced by irradiating in nitrogen at 25° C. to a dose of $40 \times 10^6$ R.E.P. as a function of anneal temperature. In obtaining the results for this graph the irradiated polypropylene was allowed to remain in air for one day after it was annealed and prior to the determination of cross-linked material.

Sections of polypropylene (alta grade) irradiated at 25° C. to a dose of $40 \times 10^6$ R.E.P. were annealed at various temperatures of from 100–270° C. and the resulting product after standing in air for one day was extracted with boiling toluene to determine the percent of cross-linked polymer. These results were plotted as a graph as shown in Fig. 3 where percent of cross-linked polymer was plotted as a function of anneal temperature. From this curve it is evident that the percent of cross-linked material present after storing in air for one day after annealing declines as the anneal temperature is raised, with a sharp decline occurring above 200° C.

Sections of polypropylene (alta grade) were irradiated at 25° C. to a dose of $40 \times 10^6$ R.E.P. and annealed at various temperatures. Following such annealing, the irradiated product was kept in air for the number of days indicated and subsequently extracted with boiling toluene to determine the percent of cross-linking. The results are given in Table I.

Table I

| Ex. | Anneal Temp., ° C. | Time Elapsed Before Extraction, days | Percent Cross-linked Material |
| --- | --- | --- | --- |
| 3 | no anneal | 3–4 | 0 |
| 4 | 60 | 3–4 | 0 |
| 5 | 75 | 3–4 | 0 |
| 6 | 100 | 1 | 29 |
| 7 | 100 | 11 | 0 |
| 8 | 150 | 1 | 34 |
| 9 | 150 | 11 | 31 |
| 10 | 185 | 1 | 25 |
| 11 | 185 | 11 | 25 |
| 12 | 225 | 1 | 20 |
| 13 | 250 | 1 | 10 |
| 14 | 270 | 1 | 3 |
| 15 | 270 | 3–4 | 3 |
| 16 | 270 | 11 | 2 |

From Fig. 2 and Table I it is evident that the percent of cross-linked material present one day after irradiation rises sharply at an anneal temperature of about 100° C. and decreases as the anneal temperature is increased. However, it is to be noted that this decrease is not as fast as in the case of the elevated temperature irradiation method illustrated in Example 1 and Fig. 2. From Table I it can be seen that at anneal temperatures of 150° C. and higher about the same percentage of cross-linked material at a given temperature is found in samples that have been stored in air for 1, 3–4, or 11 days following irradiation. However, the product which had been annealed at 100° C. is not stable since the sample stored for 11 days was not as cross-linked as that annealed at the same temperature but stored for only one day (compare Example 7 with Example 6).

The following examples are presented to show that degradation in polypropylene's physical properties occurs over a long term when this polymer is annealed above or below 120–260° C. In these examples alta grade polypropylene was irradiated at room temperature to a dose of $40 \times 10^6$ R.E.P. and then immediately annealed at various temperatures. These sections of polypropylene were then kept in air at room temperature for five months, at which time they were tested for flexibility by folding sharply and for elongation by pulling slowly. The results are presented in Table II.

Table II

| Ex. | Anneal Temperature, ° C. | Flexibility after storage at room temperature in air for 5 months |
| --- | --- | --- |
| 17 | no anneal | Brittle, no elongation. |
| 18 | 100 | Brittle, no elongation. |
| 19 | 270 | Brittle, no elongation. |
| 20 | 150 | Flexible, will elongate. |
| 21 | 200 | Flexible, will elongate. |

From this table it is evident that when irradiated polypropylene is annealed below or above 120–260° C., degradation of its physical properties occurs, resulting in the formation of a non-flexible, brittle polymer having zero elongation. On the other hand, when annealed within this temperature range, there is produced a flexible polymer capable of being elongated. Thus, for long term stability the anneal temperature is critical and should not be too low or too high.

Blends of polypropylene and other polymers, such as polyethylene, can be treated in accordance with this invention.

EXAMPLE 22

This example illustrates the irradiations of blends of polypropylene with the high density polyethylene described in application Serial No. 623,701, filed concurrently herewith and assigned to the same assignee.

Equal amounts of intimately blended high density polyethylene, (Marlex-50, Phillips Petroleum Company) and alta grade polypropylene were irradiated at 25° C. to a dose of $40 \times 10^6$ R.E.P. and immediately annealed at 150° C. Although these blends were very brittle and had zero elongation before irradiation, they became quite flexible and could be elongated following irradiation and annealing.

Of course, other ratios of these polymers may be employed, for example, from 1 to 99% by weight of polyethylene in polypropylene. In addition fillers may also be employed in these blends. These blends can be irradiated and annealed over the ranges herein disclosed. Similar results can also be obtained by irradiating at 100–125° C., but preferably at 110–120° C.

In addition to effectively cross-linking polypropylene and rendering it less susceptible to oxidative attack, the process of this invention may be applied to filled polypropylene. Thus, a large variety of fillers may be used in this invention, the most desirable being those which are capable of enhancing the properties of the polymer. Examples of fillers useful in this invention are carbon blacks, silica xerogels, silica aerogels, fumed silicas, hydrophobic silicas, metal silicates such as calcium silicate, titanium dioxide, zinc oxide, metal carbonates, such as calcium carbonate, magnesium carbonate, aluminas, clays, comminuted glass, etc. As a general rule, it is desirable that the filler have a surface area of about 1 or more square meter per gram but preferably more than about 40 square meters per gram. The amount of filler advantageously present will, of course, depend on the particular filler employed and its surfaces characteristics, etc. may range from 1% to 60% or more based on total weight, with the preferable range being 20–40%.

The products of this invention can be used in those applications where unirradiated polypropylene has heretofore been employed except that the irradiated product has the advantage of being a cross-linked polymer with accompanying improved properties, such as infusibility, enhanced insolubility, etc. Thus, irradiated polypropylene can be used as electrical insulating tapes, as fluid conduits or containers, as filaments or fibers, as insulating coating on wire, etc.

While the present invention has been described by reference to particular embodiment and examples thereof, variations will readily occur to those skilled in the art. It is therefore intended in the appended claims to cover all equivalents as may be in the true spirit and scope of the foregoing description, for example, various modifying agents, such as dyes, pigments, stabilizers, for example, di-$\beta$-naphthyl-p-phenylene diamine, etc. may be added to the polypropylene composition without departing from the scope of the invention.

What I claim as new and desire to secure by Letters Patent of the United States is:

1. Solid irradiatively cross-linked polypropylene, which is characterized by (1) its resistance to oxidation in air, (2) its freedom from substantially all of the radiation-induced free radicals, and (3) its freedom from substantial degradation by oxygen.

2. A process of producing solid, cross-linked polypropylene that is resistant to oxidation in air and substantially free of radiation-induced free radicals which comprises irradiating at a temperature in the range of 100–125° C., a polypropylene which is normally a crystalline solid at room temperature, with ionizing radiation having energy equivalent to at least $5 \times 10^4$ electron volts.

3. A process of producing solid, cross-linked polypropylene that is resistant to oxidation in air and substantially free of radiation-induced free radicals which comprises irradiating at a temperature in the range of 110–120° C., a polypropylene which is normally a crystalline solid at room temperature, with ionizing radiation having energy equivalent to at least $5 \times 10^4$ electron volts.

4. A process of producing solid, cross-linked polypropylene that is resistant to oxidation in air and substantially free of radiation-induced free radicals which comprises irradiating a polypropylene while it is in a solid, crystalline state, with ionizing radiation having energy equivalent to at least $5 \times 10^4$ electron volts, and destroying substantially all of the radiation-induced free radicals trapped in the polypropylene before they can react with oxygen, by heating the irradiated polymer to a temperature in the range of 120–260° C.

5. A process of producing solid, cross-linked polypropylene that is resistant to oxidation in air and substantially free of radiation-induced free radicals which comprises irradiating polypropylene while it is in a solid, crystalline state, with ionizing radiation having energy equivalent to at least $5 \times 10^4$ electron volts, and destroying substantially all of the radiation-induced free radicals trapped in the polypropylene before they react with oxygen, by heating the irradiated polymer to a temperature in the range of 130–200° C.

6. A process of producing solid, cross-linked blends of polypropylene and polyethylene that are resistant to oxidation in air and substantially free of radiation-induced free radicals which comprises irradiating at a temperature in the range of 100–125° C., a blend of polyethylene and a polypropyene which is normally a crystalline solid at room temperature, with ionizing radiation having energy equivalent to at least $5 \times 10^4$ electron volts.

7. A process of producing solid, cross-linked blends of polypropylene and polyethylene that are resistant to oxidation in air and substantially free of radiation-induced free radicals which comprises irradiating at a temperature in the range of 110–120° C., a blend of polyethylene and a polypropylene which is normally a crystalline solid at room temperature, with ionizing radiation having energy equivalent to at least $5 \times 10^4$ electron volts.

8. A process of producing solid, cross-linked blends of polypropylene and polyethylene that are stable to oxidation in air and substantially free of radiation-induced free radicals which comprises irradiating a blend of polyethylene and a polypropylene while the blend is in a solid, crystalline state, with ionizing radiation having energy equivalent to at least $5 \times 10^4$ electron volts, and destroying substantially all of the radiation-induced free radicals trapped in the polypropylene before they react with oxygen, by heating the irradiated polymer to a temperature in the range of 120–260° C.

9. A process of producing solid, cross-linked blends of polypropylene and polyethylene that are stable to oxidation in air and substantially free of radiation-induced free radicals which comprises irradiating a blend of polyethylene and a polypropylene while the blend is in a solid, crystalline state, with ionizing radiation having energy equivalent to at least $5 \times 10^4$ electron volts, and destroying substantially all of the radiation-induced free radicals trapped in the blend of polypropylene and polyethylene before they can react with oxygen, by heating the irradiated polymer to a temperature in the range of 130–200° C.

10. An irradiatively cross-linked blend of solid polypropylene and solid polyethylene, which is characterized by (1) its resistance to oxidation in air, (2) its freedom from substantially all of the radiation-induced free radicals, and (3) its freedom from substantial degradation by oxygen.

11. A process as in claim 2 wherein high energy electrons are the source of the ionizing radiation.

12. The method as in claim 2 wherein the polyproplene is irradiated to a radiation dose of $1 \times 10^6$ to $1 \times 10^8$ R.E.P.

13. The method as in claim 4 wherein high energy electrons are the source of the ionizing radiation.

14. The method as in claim 4 wherein the polypropylene is irradiated to a radiation dose of $1 \times 10^6$ to $1 \times 10^8$ R.E.P.

References Cited in the file of this patent

Nature, vol. 170, December 1952, pages 1075–76.
Modern Plastics, vol. 31, April 1954, pp. 100, 101, 219.
Chemical Engineering, vol. 62, September 1955, pp. 228, 230, 232, 234.
Modern Plastics, vol. 32, September 1954, page 229.